(12) United States Patent
Little

(10) Patent No.: US 6,923,144 B2
(45) Date of Patent: Aug. 2, 2005

(54) HEATED PET ENCLOSURE

(76) Inventor: Ronald B. Little, 181 Hickory Ridge Rd., Florence, MS (US) 39073

(*) Notice: Subject to any disclaimer, the term of this patent is extended or adjusted under 35 U.S.C. 154(b) by 0 days.

(21) Appl. No.: 10/745,186

(22) Filed: Dec. 22, 2003

(65) Prior Publication Data
US 2005/0132974 A1 Jun. 23, 2005

(51) Int. Cl.⁷ ............................. A01K 1/02; A01K 1/00
(52) U.S. Cl. ...................................... 119/482; 119/448
(58) Field of Search ......................... 119/482, 416, 437, 119/444, 448, 508, 303, 308, 310, 313, 312, 119/318, 320, 51.5, 28.5, 73

(56) References Cited

U.S. PATENT DOCUMENTS

| | | | |
|---|---|---|---|
| 2,280,779 A | 4/1942 | Barragy | |
| 3,962,993 A | 6/1976 | Dattilo | |
| D256,734 S | 9/1980 | Riley | |
| 4,257,349 A | 3/1981 | Carlin | |
| 4,332,214 A | 6/1982 | Cunningham | |
| 4,591,694 A | 5/1986 | Phillips | |
| 4,696,260 A | 9/1987 | Panessidi | |
| 5,003,923 A * | 4/1991 | Morgan | 119/482 |
| 5,012,763 A * | 5/1991 | Morrison | 119/302 |
| D348,958 S | 7/1994 | McLellan | |
| 5,371,340 A | 12/1994 | Stanfield | |
| 5,452,683 A * | 9/1995 | Poffenroth | 119/73 |
| 5,551,371 A * | 9/1996 | Markey et al. | 119/499 |
| D379,014 S | 4/1997 | Woods | |
| 5,746,271 A * | 5/1998 | DeCosta | 165/53 |
| 5,908,008 A * | 6/1999 | Sensabaugh | 119/80 |
| 5,983,889 A * | 11/1999 | Thomas | 126/351.1 |
| 6,084,209 A | 7/2000 | Reusche | |
| 6,189,487 B1 | 2/2001 | Owen | |
| 6,363,886 B1 * | 4/2002 | Statton | 119/51.5 |
| 2002/0152969 A1 | 10/2002 | Grigsby | |

FOREIGN PATENT DOCUMENTS

| | | | | |
|---|---|---|---|---|
| JP | 2000116262 A | * | 4/2000 | A01K 1/00 |
| JP | 2001231691 A | * | 8/2001 | A47J 39/02 |
| JP | 2002262692 A | * | 9/2002 | A01K 1/02 |

* cited by examiner

Primary Examiner—Son T. Nguyen

(57) ABSTRACT

This invention provides a pet enclosure designed to provide comfort for a pet in the winter season. The pet enclosure provides for shelter by allowing the pet to get out of the weather and then provides a warm bed to lie upon. This warm bed is comprised of a rectangular rigid plastic container, similar to a tall, wide, narrow gas can, which is recessed into the floor of the pet enclosure. An internal, totally submersible aquarium type heater is utilized to keep the water solution tank at a user-defined temperature. The tank is recessed into the floor and is effectively insulated on five of its six surfaces. The remaining top surface is covered by a fiber-filled pet bed. This bedding, when not compressed by the pet, acts as an insulator, trapping the heat in the container. When the pet lies on the bedding, the insulating value of the bedding is drastically reduced and the heat travels through the bedding and the pet is warmed. This provides for a comfortable warm area for the pet to enjoy on cold winter days.

14 Claims, 5 Drawing Sheets

HEATED PET ENCLOSURE

BACKGROUND OF THE INVENTION

1. Field of Invention

This invention relates to providing outdoor pets with a comfortable shelter during the winter weather. Pets age similarly to people. For example, arthritis is relatively common in canines and humans as they age. Cold weather tends to bring on the aches and pains associated with arthritis. As humans, we are able to adjust thermostats, add additional layers of clothing, take hot baths or whirlpools, apply ointments, etc., while an aged pet may only have the choice of lying there in the cold.

2. Related Art

Many ideas have surfaced and have been patented in concern of our outdoor pets. As with many inventions, they contain advantages and disadvantages according to the means of providing their application. Several patents are for electric heating type pads. U.S. Pat. No. 6,084,209 issued to Reusche, teaches that electric pads tend to create hot spots which are areas of localized heat which can expose the pet to possible burns as well as the possibility of electrical fires due to these pads getting hot and owners adding additional bedding to keep the animal warm. U.S. Pat. No. 4,257,349 issued to Carlin for an anabolic recovery heating unit for small animals, addresses the hot spot issues associated with the electric type animal pads. U.S. Pat. No. 4,332,214, issued to Cunningham, teaches about the dangers of the animal chewing or clawing anything in their environment. The electric pad, its controls and its wiring are dangerous for the animal's normally harmless chewing which could result in electrocution or fire. Cunningham further points out that flexible vinyl bladders may easily be punctured by tooth or claw with disastrous results is a primary criticism of pet water beds, and a secondary criticism is the fact that the motion of flexible water support which humans find so comforting is usually unacceptable to an animal. U.S. Pat. No. 6,189,487B1 issued to Owen, addresses the electrocution concern by using a step down transformer to minimize the amount of shock to the animal. Owen further reduces the temperature and allows for owner temperature regulation by placing the heating element under different layers of the foam material to eliminate the need of a thermostat. Precise temperature regulation of an electric pad is an issue which is complicated with the existence of possible hot spots, and is further complicated by the innate nature of the pets to chew and claw things.

Even with the inherent temperature regulation problems (hot spots) and the inherent electrically-associated risks to the pet, they are primarily the only heating system manufactured and marketed to the typical pet owner for their pet.

SUMMARY OF THE INVENTION

My invention provides a simplistic approach to provide an outdoor pet a cozy pet home during the cold weather months of the year. The lack of consumer available, heated pet enclosures has generated this invention.

This invention provides a pet shelter with a well insulated floor, several inches thick. The floor will reduce the heat loss from the pet directly to the cold ground, as compared to the typical manufactured plastic molded dog houses. In addition to the added insulation in the floor, a heated, rigid container is recessed so that its top surface is level with the floor. This rigid container is filled with a water solution, which is maintained at a selected temperature anywhere between 78 to 100 degrees Fahrenheit, by using an aquarium type heater. A pet mat is secured to the floor of the pet enclosure. Five sides of the heated tank are well insulated, with the remaining top surface of the tank covered by a fiber filled pet mat. The pet mat acts as an insulating blanket to the heated tank. When the pet lies on the pet mat, it compresses from thick to thin, the R-value goes from a higher R-value to a lower R-value, and the heat stored and being generated in the tank is readily absorbed by the pet. This gives the pet a warm place to lie. No longer is the pet lying on the equivalent of a slightly above freezing or below freezing ground during winter; instead, the pet is now resting upon, for example, a 95 degree Fahrenheit water bottle.

By using a totally submersible aquarium type water heater with its associated thermostat in a rigid plastic tank, several objectives of the invention have been met.

1. Accuracy and reliability: fish aquariums have very strict temperature requirements which provide very narrow temperature swings, therefore aquarium type heaters must provide accurate temperature control as well as a long operating life.
2. Safety: because the aquarium type heaters have been engineered to operate safely while being submerged in water; by having it internally mounted in the tough rigid plastic tank, a pet cannot bite or claw the heater or control circuitry.
3. Animal comfort: the heat storage characteristics of water assures uniform heat distribution, thereby eliminating the possibility of hot spots.
4. Reserve capacity: in event of a short power outage, the heat in the tank can continue to warm the pet for a couple of hours.
5. Economical to manufacture and market: Basically, the aquarium type heaters are inexpensive as are the rigid plastic tanks, and both are widely available from various manufacturers.
6. Economical to operate: The abovementioned heaters are sized by capacity of the tank; a heater in the 200–300 watt range will suffice to maintain the tank at the desired temperature.

In conclusion, up to now there has not been made available, to the consumer pet industry, a design for a heated pet enclosure which can be manufactured and marketed to the consumer of pet products at a price which is affordable to the consumer and is comparatively competitive to non-heated pet enclosures. This invention fills this void in the consumer pet market.

DETAILED DESCRIPTION OF THE PREFERRED EMBODIMENT

Figure 1:
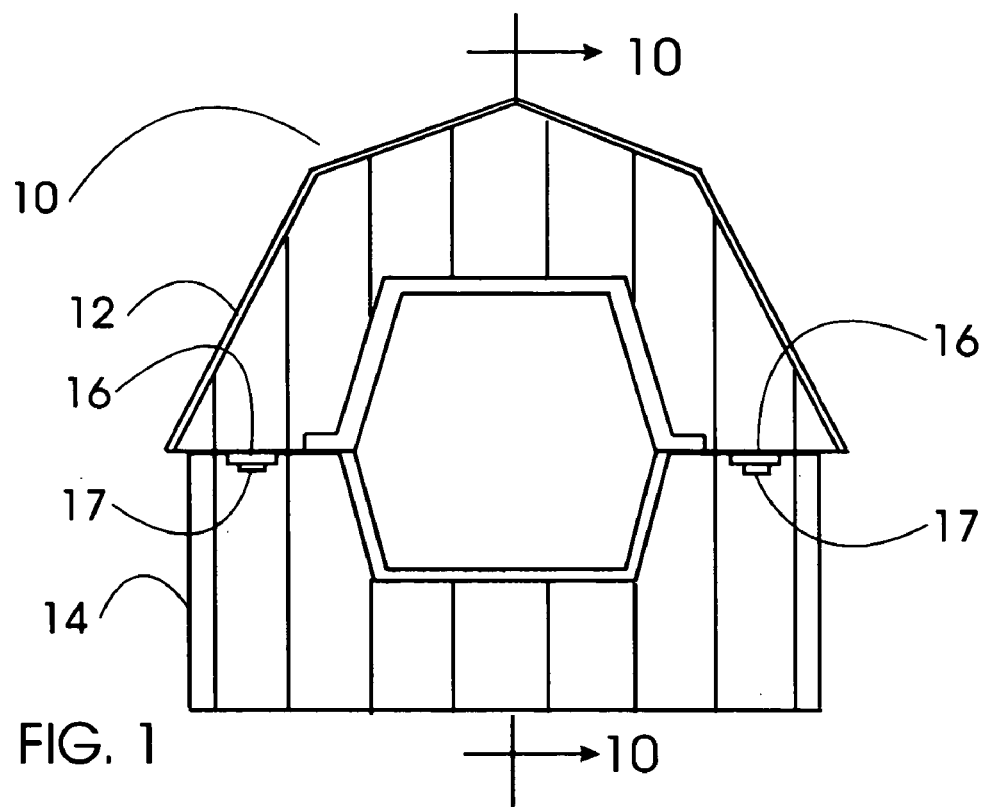
FIG. 1 is the front elevational view of the heated pet enclosure.
Figure 2:
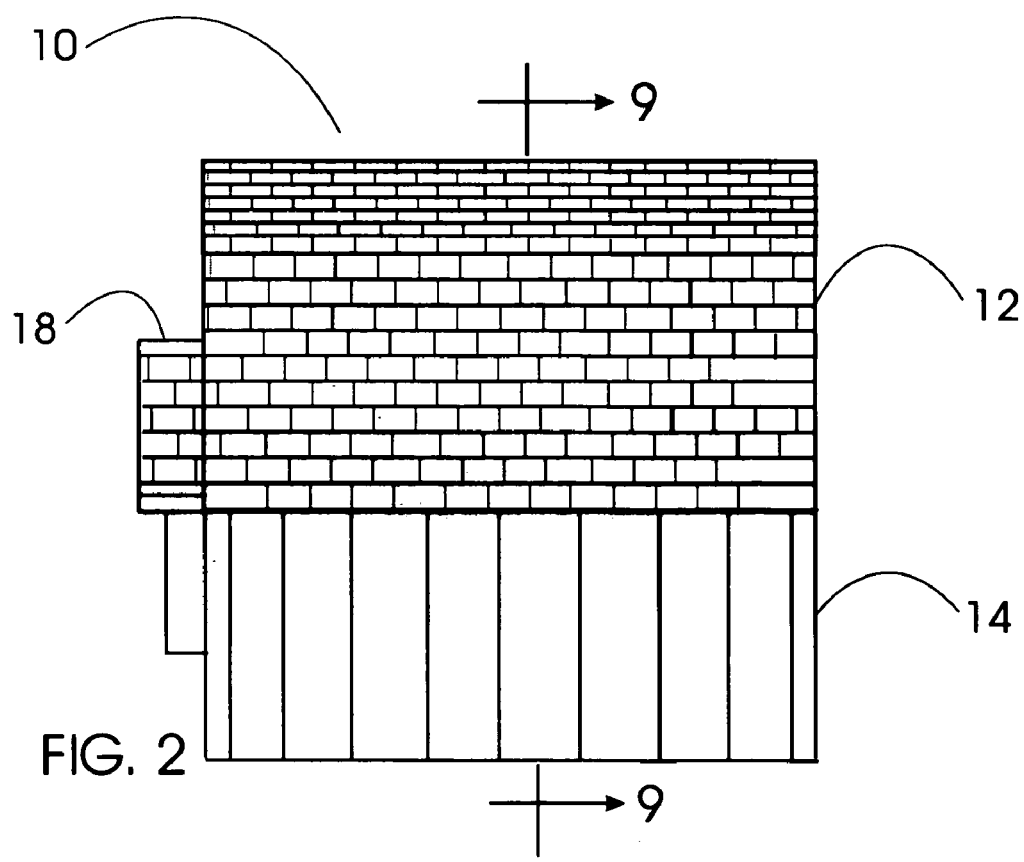
FIG. 2 is the side elevational view of the heated pet enclosure.
Figure 3:
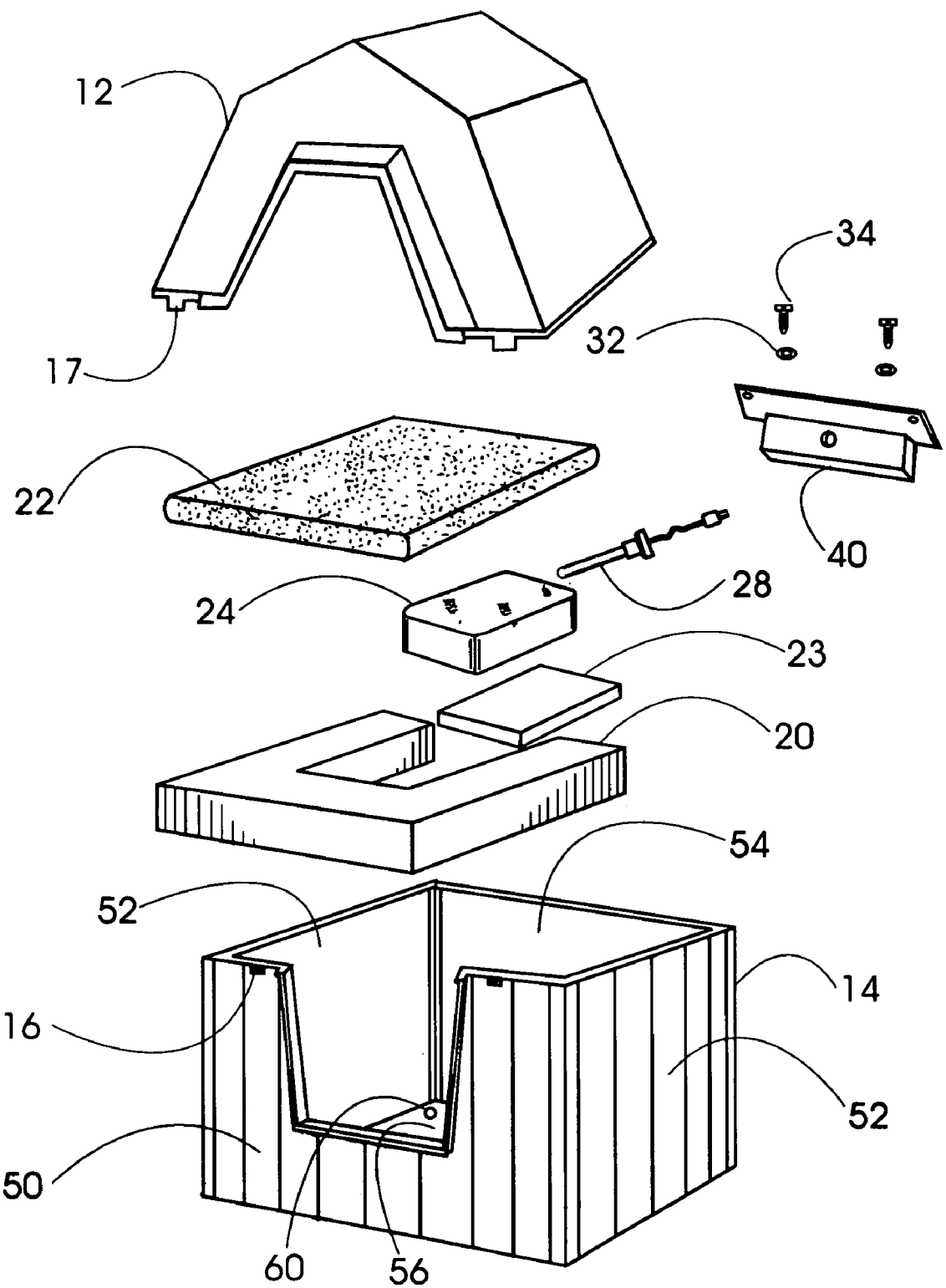
FIG. 3. is an exploded perspective view of the pet enclosure.
Figure 4:
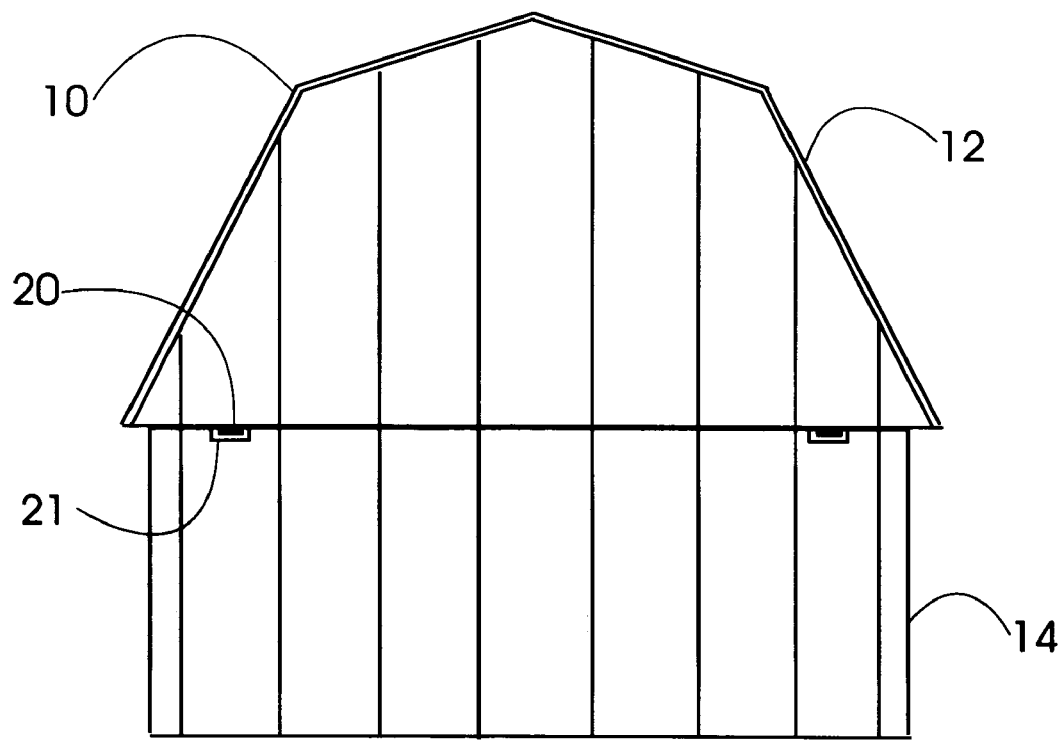
FIG. 4 is the rear elevational view of the heated pet enclosure.

Referring now to the drawings in which reference numerals designate like or corresponding parts through several views shown in FIGS. 1–10. The heated pet enclosure according to the present invention is designated by the reference numeral 10. Heated pet enclosure comprises a base 14 and a roof 12 (FIGS. 1 & 2).

The base 14 is comprised of two sidewalls 52 (FIG. 3), a rear wall 54, a front wall 50, and a floor 56. Drain holes 60 (FIGS. 9 & 10) in floor 56 permit draining of any moisture which may accumulate in heated pet enclosure.

Roof 12 is locked into position by hinge connectors (FIG. 4) 20 & 21 on the rear of heated pet enclosure 10 and mated to the base 14 by connectors 16 & 17 (FIG. 3) on the front wall 50.

The main floor insulator is a "U" shaped rigid form 20 (FIG. 3), which is placed in the bottom of the pet shelter base 14. The tank floor insulator 23 fits in the opening of the "U" shaped insulator 20. The immersible heater 28 is inserted in the water solution filled tank 24 and securely sealed by tank cap 30 (FIG. 6) and the assembly is fitted into opening of the "U" shaped insulator 20 on top of the floor insulator 23.

Rear tank insulator 40 is installed posterior to tank 24 and power cord of heater 28 is routed through hole in rear tank insulator 40.

Screws 34 and washers 32 fasten rear tank insulator 40 to "U" shaped floor insulator 20. This rear tank insulator 40 provides posterior insulation for the tank 24 and covers the power cord of the heater 28 to prevent a pet from chewing on the electrical connections or the cap 30 of the tank 24.

Pet mat 22 is placed over the "U" shaped insulator 20 and the tank assembly 24. The pet can rest on the mat 22 and absorb the warmth of the heated tank 24.

Figure 5:
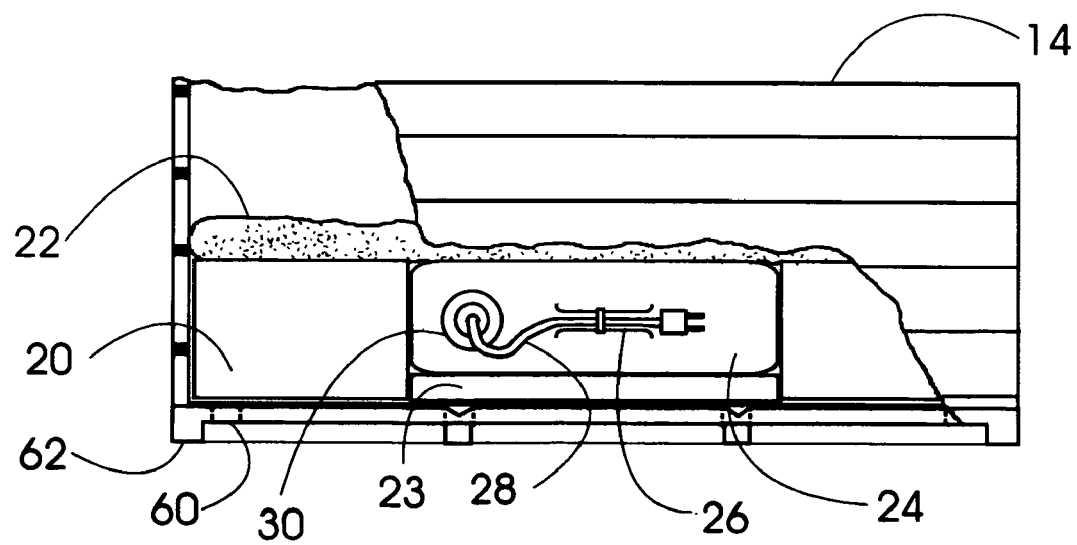
FIG. 5 is a detailed, partial cut away view of the heated tank placement in a rear elevational view of the lower enclosure assembly.
Figure 6:
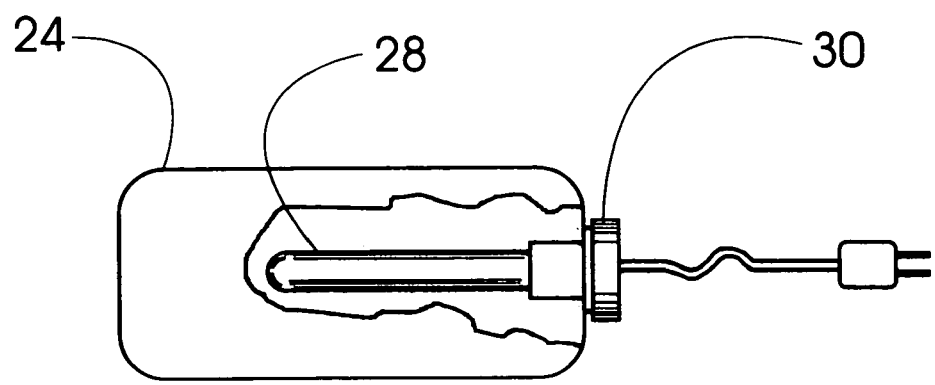
FIG. 6 is a detailed, partial cut away view of the heater and the tank assembly.
Figures 7, 8:
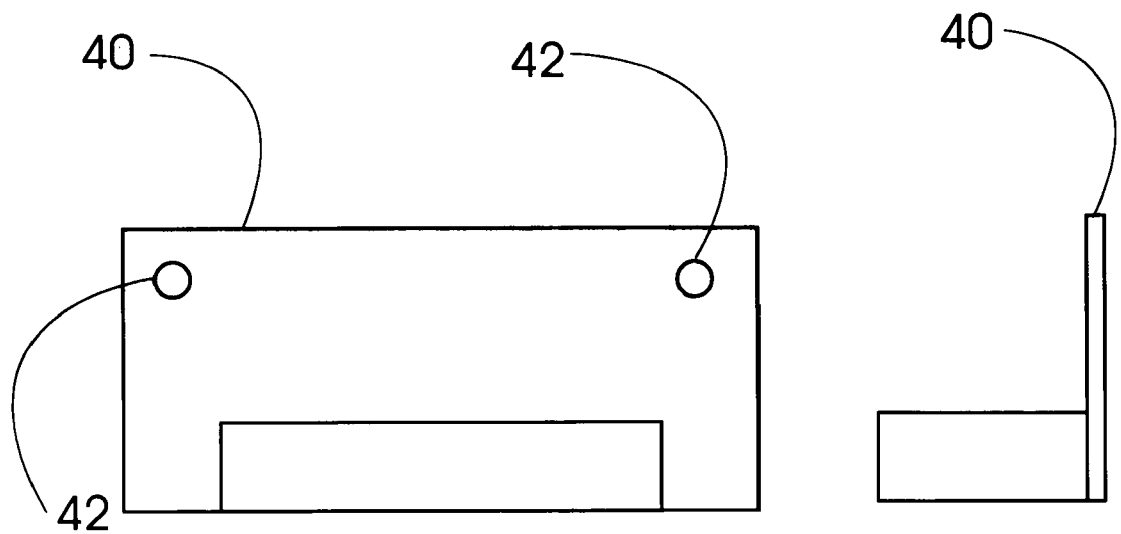
FIG. 7 is the rear cover and insulator block shown in the front view.
FIG. 8 is the rear cover and insulator block shown in the lateral view.
Figure 9:
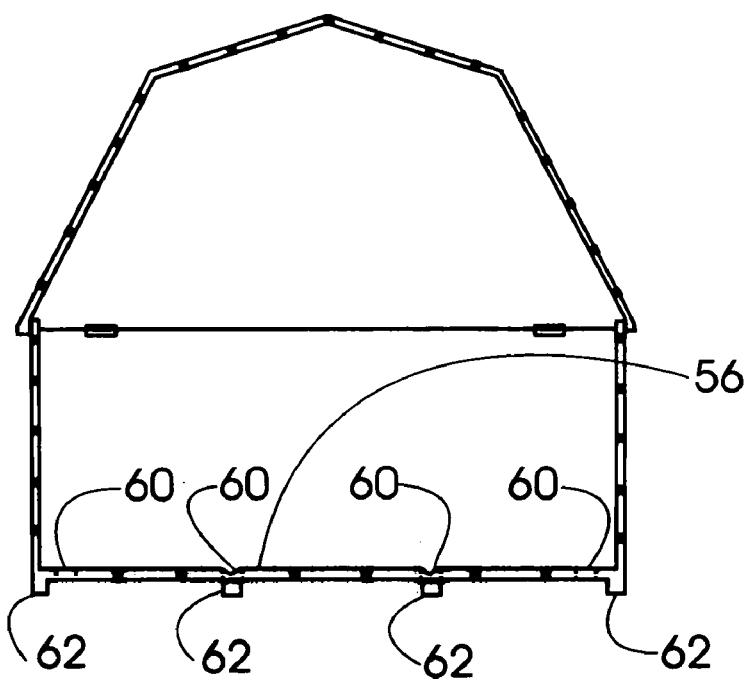
FIG. 9 is a sectional view in the direction of arrows 9—9 shown in FIG. 2.
Figure 10:
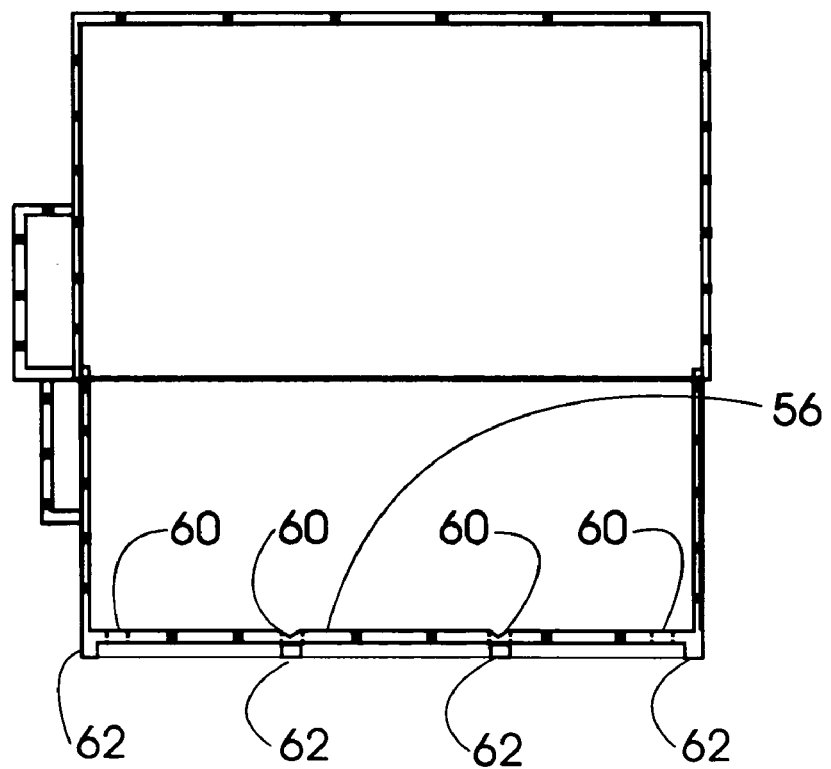
FIG. 10 is a sectional view in the direction of arrows 10—10 in FIG. 1.

FIG. 5 details the tank's 24 position through the partial cut away view. "U" shaped insulator 20 insulates the tank 24 on 3 sides. Bottom insulator 23 insulates the bottom of the tank 24. Tank 24 has a molded handle 26 for ease of positioning the tank 24 in the pet enclosure 10. Drainage holes 60 allow for draining of any moisture which may occur in pet enclosure 10. Support gussets 62 (FIGS. 9 & 10) support pet enclosure 10 above ground and allow a space in which accumulated moisture can drain to from drain holes 60. "V" shaped channels are shown above center support gussets 62 in FIGS. 9 & 10, these "V" shaped channels provide drainage system and run from front to back of pet enclosure floor 56 in FIG. 9 and from side to side of pet enclosure floor 56 in FIG. 10.

The fit between "U" shaped floor insulator 20 and the walls of the pet enclosure 52, 50, 54 allows sufficient space to allow moisture drainage to the floor 56. The fit between the bottom insulator 23 and "U" shaped floor insulator 20 also allows sufficient space for moisture drainage to the floor.

Assembly of heated pet enclosure 10 consists of placing "U" shaped insulator 20 in base 14. Tank 24 filled with solution, with heater 28 installed is placed on top of tank insulator 23 in recess of "U" shaped insulator 20. Cord of heater 28 is routed through hole in rear tank insulator 40 which is fastened to "U" shaped insulator 20 by screws 34 and washers 32. Power cord is routed through knockout hole (not shown) in rear wall 54 of pet enclosure 10 and is connected with a consumer supplied extension cord to a GFI certified outlet. The GFI outlet will assure the typically harmless chewing that a pet may do will not result in injury to the pet. Roof assembly is aligned using the hinge assemblies 20 and 21 (FIG. 4) on the roof assembly 12 and base assembly 14 and locked down using the locking mechanisms 17 of roof assembly mated to 16 of the base assembly.

The pet mat 22 is finally placed in the heated pet enclosure 10.

I claim:

1. A heated pet enclosure consisting of:
    a. a base comprising vertical walls supporting a detachable roof, said base is sufficient in size to house a pet, and contains an opening sufficient in size to permit pet entrance and exiting of said heated pet enclosure;
    b. an elevated floor residing in said base and said elevated floor, formed from a waterproof polymer material having insulating properties and said elevated floor defines a U-shaped rigid form; and
    c. a waterproof rectangular container filled with a high caloric capacity fluid, said rectangular container being constructed of a rigid plastic and said rectangular container to house an electrically operable submersible heater.

2. The pet enclosure in claim 1, wherein said base comprising drainage openings for drainage of any accumulated moisture.

3. The pet enclosure in claim 1, wherein said submersible heater contains a user-adjustable thermostat for temperature regulation.

4. The pet enclosure in claim 1, wherein said rectangular container when filled and mounted in said U-shaped rigid form, top surface of said rectangular container will be flush with top surface of said elevated floor.

5. The pet enclosure in claim 4, wherein said rectangular container is constructed of rigid plastic and when filled with said high caloric capacity fluid will support the weight of said pet.

6. The pet enclosure in claim 5, wherein said rectangular container provides an opening sufficient in size to allow passage of said submersible heater and a tank cap for sealing said submersible heater around the power cord.

7. The pet enclosure in claim 6, wherein said cord of said immersion heater is isolated from said pet by the rear cover.

8. The pet enclosure in claim 5, wherein said rectangular container incorporates a handle to help facilitate filling and positioning of said rectangular container in said pet enclosure.

9. The pet enclosure in claim 5 wherein said rectangular container is placed on a tank floor insulator in said U-shaped rigid form.

10. The pet enclosure in claim 9 wherein said rectangular container has a rear tank insulator positioned between said rectangular container and a wall of said heated pet enclosure.

11. The pet enclosure in claim 1, wherein said pet enclosure uses a pet pad conducive to the conduction of heat from said rectangular container to said pet.

12. The pet enclosure in claim 1, wherein the exposed surface of said elevated floor will be made of a waterproof rigid polymer material and the surface below the floor will be constructed or filled with a material having both insulating and weight-bearing characteristics, and said U-shaped rigid form will also have a waterproof surface and the above aforementioned insulation and weight bearing characteristics between the floor of said U-shaped rigid form and said base.

13. The pet enclosure in claim 12, wherein said U-shaped rigid form will provide drainage openings for any accumulated moisture.

14. A pet enclosure comprising:
   a. a base comprising a front wall, side walls and a rear wall supporting a detachable roof, said structure is sufficient in size to house a pet, said front wall contains an opening sufficient in size to permit pet entrance and exiting of said heated pet enclosure;
   b. an elevated floor insulated and waterproofed, with an U-shaped rigid form to provide housing for a rectangular tank;
   c. a rectangular tank molded from a rigid polymer which can be filled with a high caloric capacity fluid;
   d. a submersible thermostatically controlled electric water heater which the temperature is user adjustable;
   e. a fiber filled pet pad which can be secured to the floor of said pet enclosure;
   h. a means for drainage of accumulated moisture from said pet enclosure;
   i. a rear cover to isolate the electrical heater cord from said pet;
   j. a tank floor insulator placed under said rectangular tank; and
   k. a rear tank insulator positioned between said rectangular tank and rear wall of said heated pet enclosure.

* * * * *